(12) United States Patent
Keiser et al.

(10) Patent No.: US 8,234,215 B2
(45) Date of Patent: Jul. 31, 2012

(54) METHOD FOR PREPAID DEBIT CARD WITH OVERDRAFT CAPABILITIES

(75) Inventors: Bradley S. Keiser, Amelia, OH (US); Roger W. Dean, Cincinnati, OH (US)

(73) Assignee: CNG Financial Corporation

( * ) Notice: Subject to any disclaimer, the term of this patent is extended or adjusted under 35 U.S.C. 154(b) by 1127 days.

(21) Appl. No.: 11/474,780

(22) Filed: Jun. 26, 2006

(65) Prior Publication Data
US 2007/0100745 A1      May 3, 2007

Related U.S. Application Data

(60) Provisional application No. 60/693,856, filed on Jun. 24, 2005.

(51) Int. Cl.
*G06Q 40/00* (2012.01)
(52) U.S. Cl. .......................................................... 705/41
(58) Field of Classification Search ..................... 705/38, 705/41
See application file for complete search history.

(56) References Cited

U.S. PATENT DOCUMENTS

| | | | |
|---|---|---|---|
| 4,321,672 A | | 3/1982 | Braun et al. |
| 4,907,257 A | * | 3/1990 | Asano et al. ............ 379/144.04 |
| 6,029,149 A | * | 2/2000 | Dykstra et al. .................. 705/38 |
| 6,374,231 B1 | | 4/2002 | Bent et al. |
| 6,411,942 B1 | | 6/2002 | Fujimoto |
| 6,647,376 B1 | | 11/2003 | Farrar et al. |
| 7,006,632 B2 | | 2/2006 | Meadow et al. |
| 7,337,947 B1 | * | 3/2008 | Swanson, Sr. ................ 235/375 |
| 2006/0059085 A1 | | 3/2006 | Tucker |

OTHER PUBLICATIONS

Overdraft, definition obtained from investopedia and wayback machine, available online @ http://web.archive.org/web/20010303101715/http://www.investopedia.com/terms/o/overdraft.asp, last accessed Jan. 5, 2009.*

Fico score, definition obtained from investopedia and wayback machine, available online @ http://web.archive.org/web/20041225071841/http://www.investopedia.com/terms/f/ficoscore.asp, last accessed Jan. 5, 2009.*

* cited by examiner

*Primary Examiner* — Mary Cheung
*Assistant Examiner* — Daniel L Greene
(74) *Attorney, Agent, or Firm* — Frost Brown Todd LLC (57) ABSTRACT

Disclosed is a method for implementing a prepaid debit card with overdraft capabilities. The system utilizes a real-time overdraft privilege risk analysis scoring module to calculate scores based on several criteria. The customer accounts are established within an aggregated general ledger account and are monitored and managed by a core processor. The overdraft privilege risk analysis scoring module operates in real time per card, per transaction.

18 Claims, 5 Drawing Sheets

Matrix of Customer X Scoring

| | Date | Load Amount | Recurring Value Load | ODs Per Day | OD Current Cycle | Fees Assessed | Ave. Days in OD | Days Since Qualifying Trans | Score (Cumulative) | OD Eligible Amount | Note |
|---|---|---|---|---|---|---|---|---|---|---|---|
| A | 3/15/2006 | $1,000 | 0 | 0 | 0 | $0.00 | 0 | 0 | N/A | N/A | Day Customer X Acquired his/her card. No qualifying data. |
|   | Score | N/A | N/A | N/A | N/A | N/A | N/A | N/A | | | |
| B | 3/31/2006 | $1,000 | 1 | 1 | 1 | $29.00 | 3 | 16 | 0.57 | N/A | Only First Recurring ACH: Not yet qualified. |
|   | Score | 2 | 1 | 1 | 1 | 1 | 0 | -2 | | | |
| C | 4/15/2006 | $1,000 | 2 | 1 | 2 | $36.00 | 3 | 31 | 0.71 | $250.00 | OD Eligible Amount based on previous cycle activity. |
|   | Score | 2 | 2 | 1 | 0 | 1 | 0 | -1 | | | |
| D | 4/30/2006 | $1,000 | 3 | 1 | 3 | $47.00 | 5 | 46 | 0.29 | $250.00 | |
|   | Score | 2 | 2 | 1 | -1 | 1 | -2 | -1 | | | |
| E | 5/15/2006 | $1,000 | 4 | 0 | 0 | $0.00 | 0 | 61 | 1.71 | $250.00 | |
|   | Score | 2 | 2 | 2 | 2 | 2 | 2 | 0 | | | |
| F | 5/31/2006 | $300 | 5 | 0 | 0 | $0.00 | 0 | 77 | 1.43 | $250.00 | Personal Leave; Recurring ACH smaller. |
|   | Score | 0 | 2 | 2 | 2 | 2 | 2 | 0 | | | |
| G | 6/15/2006 | $1,000 | 6 | 4 | 4 | $69.00 | 4 | 92 | -0.14 | $150.00 | Smaller OD Eligible Amount based on last Value Load. |
|   | Score | 2 | 2 | -2 | -2 | 0 | -1 | 0 | | | |
| H | 6/30/2006 | $1,000 | 7 | 2 | 2 | $36.00 | 3 | 107 | 0.71 | $0.00 | Last Cycle had negative score; no OD to be extended. |
|   | Score | 2 | 2 | 0 | 0 | 1 | 0 | 0 | | | |

Fig. 4

METHOD FOR PREPAID DEBIT CARD WITH OVERDRAFT CAPABILITIES

CROSS REFERENCE TO RELATED APPLICATIONS

This application claims benefit to U.S. Provisional Application No. 60/693,856, filed Jun. 24, 2005, which is hereby incorporated by reference as if fully rewritten herein.

FIELD OF THE INVENTION

The present invention relates to a system for Prepaid or Stored Value Debit Cards with real-time overdraft capabilities, unlike procedures conducted by traditional financial institutions, where overdraft is mainly conducted in batch file processes and does not assess overdraft qualifications with each transaction in real time.

BACKGROUND OF THE INVENTION

According to recent estimates, 15 million U.S. households have no active banking relationship. Among these "unbanked" or "under-banked" consumers, "prepaid" or "stored Value" debit cards have become an increasingly popular payment vehicle. While historically the prepaid debit card market was more frequently used by the "unbanked" or "under-banked", more and more consumers who have traditional banking relationships are also enrolling in prepaid debit card programs.

Prepaid debit "cardholders" enjoy the benefits of using a payment card without the need to establish an individual, personal bank account at a financial institution. These cards are typically funded with an amount of money provided by the consumer prior to use. Once the money has been "loaded" or credited to the card, cardholders can then withdraw their funds at an ATM, or use the card to make purchases at participating merchant locations.

Until now, the maximum amount available to be spent or otherwise used on a prepaid debit card would be determined by the amount the cardholder has loaded onto the card account. If the cardholder attempted to withdraw or spend more money than was present within the balance of his card account his transactions would be denied for "insufficient funds," similar to the process of a checking account.

The present invention defines a product that is unique in the payment industry: A prepaid debit card with overdraft capabilities. This product enables qualified cardholders to access additional funds beyond those currently available within their card accounts. The decision to authorize an overdraft transaction, as well as the available amount of the overdraft, is made by, for example, the core processor in a real-time, per-card, per transaction environment. A core processor is the primary processor of the transactions. A bank may be financially responsible for accounts and transactions, but they may sub-contract to a processor to manage the transactions for them.

The present invention's overdraft privilege is a unique product offered by, for example, a core processor (as an agent of the issuers) that distinguishes the inventor's prepaid debit cards from other prepaid card products.

In the typical prepaid debit card environment an overdrawn account can reflect a "negative balance". The associations, for example MasterCard, allow "floor limits" at the point of sale, where merchants are able to accept purchases made using a network branded card product without obtaining prior authorization from the processor in real-time for a predetermined amount, allowing cardholders to periodically overdraw the balance of their card account, The amount of the floor limit is based upon the Merchant Category Code ("MCC") of the merchant location. The issuers and their partners experience losses from cardholders refusing to reimburse the parties for the overdrawn amounts. Although the ability exists to "charge-back" the amount to the merchant if the total value of the transaction falls below the floor limit, a loss will likely be incurred. A traditional issuer would be a financial institution. A non-traditional issuer could be a mall who extends credit or value to a "closed-loop" prepaid card and does not require a traditional bank as a backer. An agent of an issuer is a delegate of a financial institution given authority by that institution to conduct business on their behalf.

The present invention addresses these problems and helps to reduce these losses when a cardholder agrees to participate in the Overdraft Privilege when it is available on their prepaid debit card account. The total available amount of the overdraft privilege is calculated on an individual card basis, at the time of transaction, by utilizing a scoring method and a real-time decision making process that considers criteria such as the card account's transaction history, average card balance, number of recent overdrafts, and other available criteria. The account will reflect a negative balance until the overdraft amount and fees are automatically repaid with the next deposit.

BRIEF SUMMARY OF THE INVENTION

The present invention is devised to overcome the aforementioned problems and provides a distinct advantage in the art of overdraft protection for individual accounts that are a part of an aggregated general ledger account or aggregated Demand Deposit Account (DDA) at an issuing bank.

One embodiment of the present invention provides a method for overdraft protection associated with a prepaid debit card to be utilized by a core processor. The method includes the steps of establishing a prepaid debit card account for a customer; receiving a request for funds through an electronic communication system due to a transaction initiated by the customer; comparing the amount of the transaction to the funds available; if the transaction amount is greater than the available funds, utilizing a overdraft privilege risk analysis scoring module to analyze the request for overdraft funds based on a series of criteria; if the customer is deemed worthy of overdraft privilege, authorizing overdraft transactions at certain amounts; and; withdrawing the overdraft privilege amount and any associated fees from the customer's account when additional funds are available in the customer's account.

Another embodiment of the invention provides a method for overdraft protection associated with a prepaid debit card to be utilized by a core processor. The method includes the steps of establishing a prepaid debit card account for a customer; managing individual customer account information that corresponds to usage of the customer account; receiving a request for funds through an electronic communication system due to a transaction initiated by the customer; comparing the amount of the transaction to the funds available; if the transaction amount is greater than the available funds, utilizing an overdraft privilege risk analysis scoring module to analyze the request for overdraft funds based on a series of criteria; utilizing computed scores from the overdraft privilege risk analysis scoring module to approve the overdraft protection request; and if the customer is deemed worthy of overdraft privilege, withdrawing the overdraft privilege amount and any associated fees from the customer's account once additional funds are available in the customer's account.

Other aspects and advantages of the present invention will be more fully apparent from the following detailed description and the accompanying drawing figures.

BRIEF DESCRIPTION OF THE DRAWING FIGURES

Embodiments of the invention will now be described, by way of example only, with reference to the accompanying drawing, wherein.

The drawing figures do not limit the present invention to the specific embodiments disclosed and described herein. The drawings are not necessarily to scale, emphasis instead being placed upon clearly illustrating the principles of the invention.

DETAILED DESCRIPTION OF THE INVENTION

Reference will now be made in detail to the operation of implementations of the present invention, which are illustrated in the accompanying drawings. In those drawings, like elements and operations are designated with the same reference numbers.

The present invention may be implemented with hardware, software, or a combination thereof at the core processor's facilities.

The functionality and operation of a preferred implementation of the present invention are described below and illustrated in FIGS. 1-4. In this regard, some of the described functionality and illustrated flow diagram boxes may represent a decision, threshold, or eligibility qualifier of the scoring module of the present invention which comprises one or more executable instructions for implementing the specified rating or scoring functions. For example, functionalities described in succession may in fact be executed substantially concurrently, or the functionalities may sometimes be executed in reverse order depending on the functionality involved. Additionally, portions of the method may be implemented without the use of the advanced options, as described in more detail below.

Figure 1:
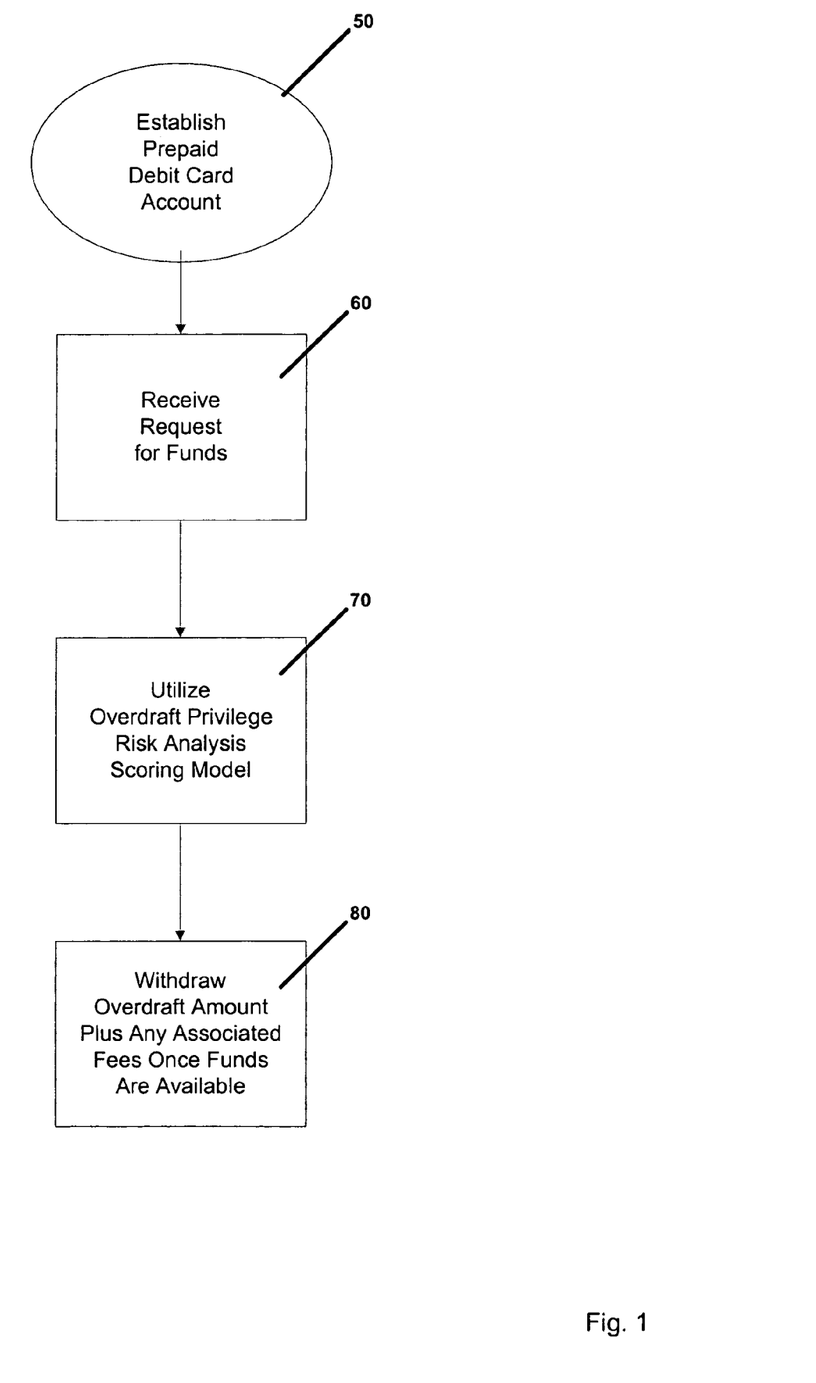
FIG. 1 is a block diagram in accordance with the present invention.

Referring generally to FIG. 1 of the present invention, the method broadly includes the steps of establishing an account for a customer, referenced at step 50 in FIG. 1; receiving a request for funds through a web browser or any other method as would be understood by one skilled in the art, due to a transaction initiated by the customer, referenced at step 60 in FIG. 1; utilizing an overdraft privilege risk analysis scoring module to analyze the request for overdraft funds based on a series of criteria, referenced at step 70 in FIG. 1; and withdrawing the overdraft privilege amount and any associated fees from the customer's account when additional funds are available in the customer's account, referenced at step 80 in FIG. 1.

The issuer (or lender) may be conventional, such as a bank or a payroll service, with direct access to the customer's employment, payroll, and other similar account and financial information. However, the present invention is likely utilized by unconventional issuers servicing the unbanked or underbanked customers (those without traditional checking accounts). These may include private companies with no affiliation with the customer's employer or bank, where the accounts are in one general aggregated ledger account. The customer accounts are established via a traditional paper application or an electronic application.

Figure 2A:
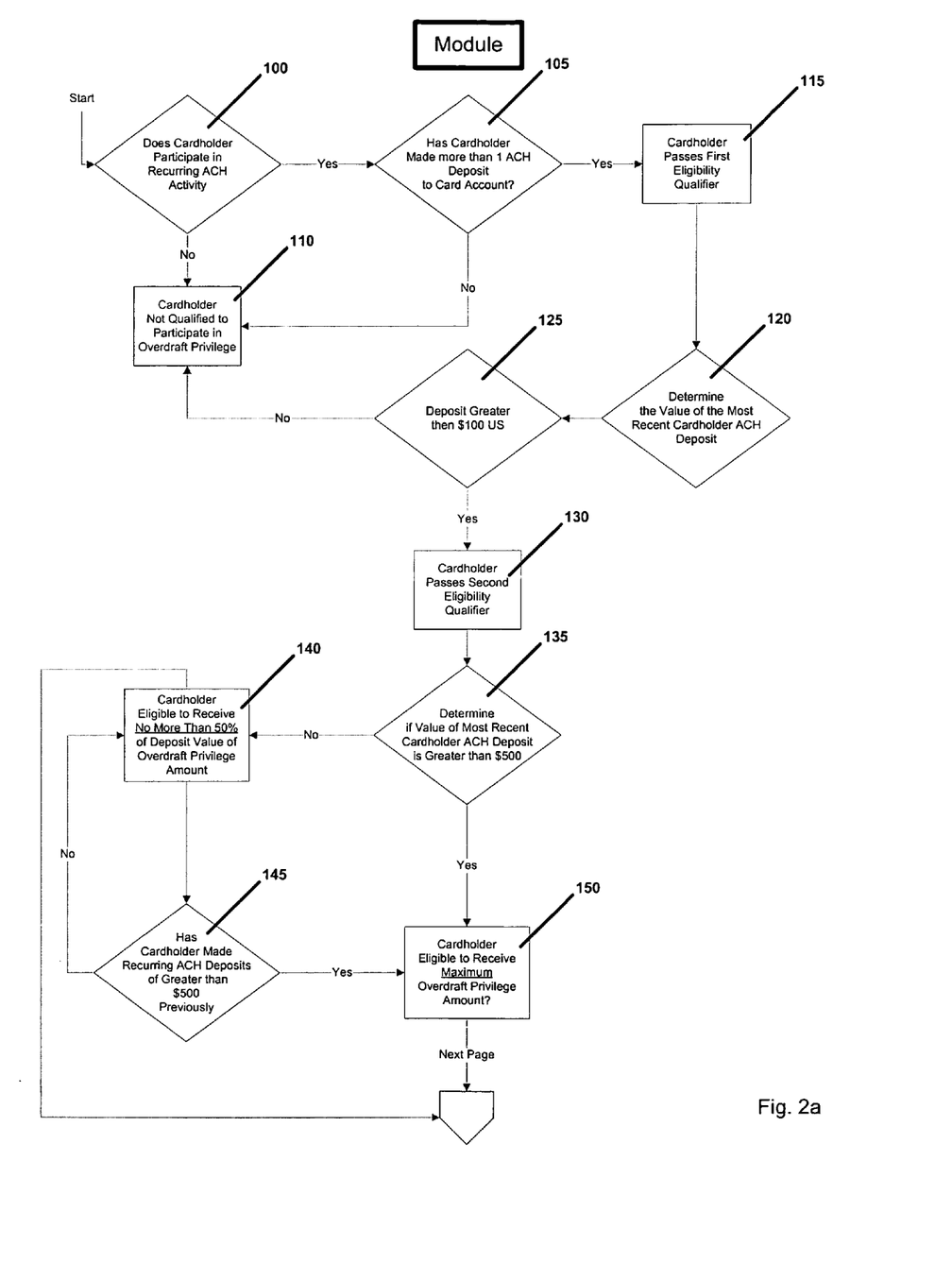
FIGS. 2a and 2b are flow diagrams in accordance with the present invention.

Referring now to FIG. 2a, there is shown a flow chart of the overdraft privilege risk qualification module. The specific steps of the overdraft privilege risk qualification module are performed in real-time, and a customer must pass various eligibility qualifiers throughout the process. FIG. 2a provides strictly exemplary steps, as each institution can choose its own criteria for determining overdraft principle qualifications. The criteria an be any known in the art for providing overdraft privilege on a traditional checking account or other criteria determined by the processor or card issuer.

Turning now to specific decision blocks or steps of the overdraft qualification module, the initial inquiry is whether the customer (or cardholder) participates in recurring ACH activity, at 100. (ACH is Automated Clearing House Network, a nationwide batch-oriented electronic funds transfer system governed by the operating rules of NACHA—The Electronics Payments Association which provide for the interbank clearing of electronic payments for participating depository financial institutions.) (NACHA—The Electronics Payments Association was formerly known as the National Automated Clearing House Association). This is a typical method used to determine eligibility in a traditional banking environment; however the present invention's steps occur in a real-time environment versus a daily batch process.

If, at step 100, the cardholder has participated in recurring ACH activity, then the qualification module tests, at 105, whether the cardholder has made more than one ACH deposit to the account. If not, at step 110, the transaction ends, as the cardholder is deemed not qualified to participate in the overdraft privilege of the present invention. The deposits correspond to recurring ACH deposits or to single fund deposits by the customer at retail loading stations.

If, at step 110, the cardholder has indeed made more than one ACH deposit, the cardholder is deemed to have passed the first eligibility qualifier, as shown at step 115. On the other hand, and similar to above, if the cardholder has not made more than one of the necessary deposits, the transaction ends, at step 110.

After passing the first eligibility qualifier stage, the system will determine the value of the most recent cardholder ACH deposit, at step 120. If the deposit is greater than a preset value (as an example only, $100 US), as shown at step 125, then the cardholder has passed the second eligibility qualifier, at 130.

After passing the second eligibility qualifier stage, the system will determine if the most recent ACH deposit by the cardholder is greater than a preset value (as an example only, $500 US), as shown at step 135. If so, the system determines that the cardholder is eligible to receive the maximum overdraft privilege amount, as shown at step 150. Again, these are exemplary steps and all of the values are variable.

However, if the most recent ACH deposit by the cardholder is not greater than a preset value, the system determines that the cardholder is eligible to receive no more than a certain percentage of the deposit value of the overdraft privilege amount (as an example only, 50%) as shown in step 140. An additional inquiry will be whether the cardholder has made recurring ACH deposits of greater than a preset value previously, as shown at step 145.

Figure 2B:
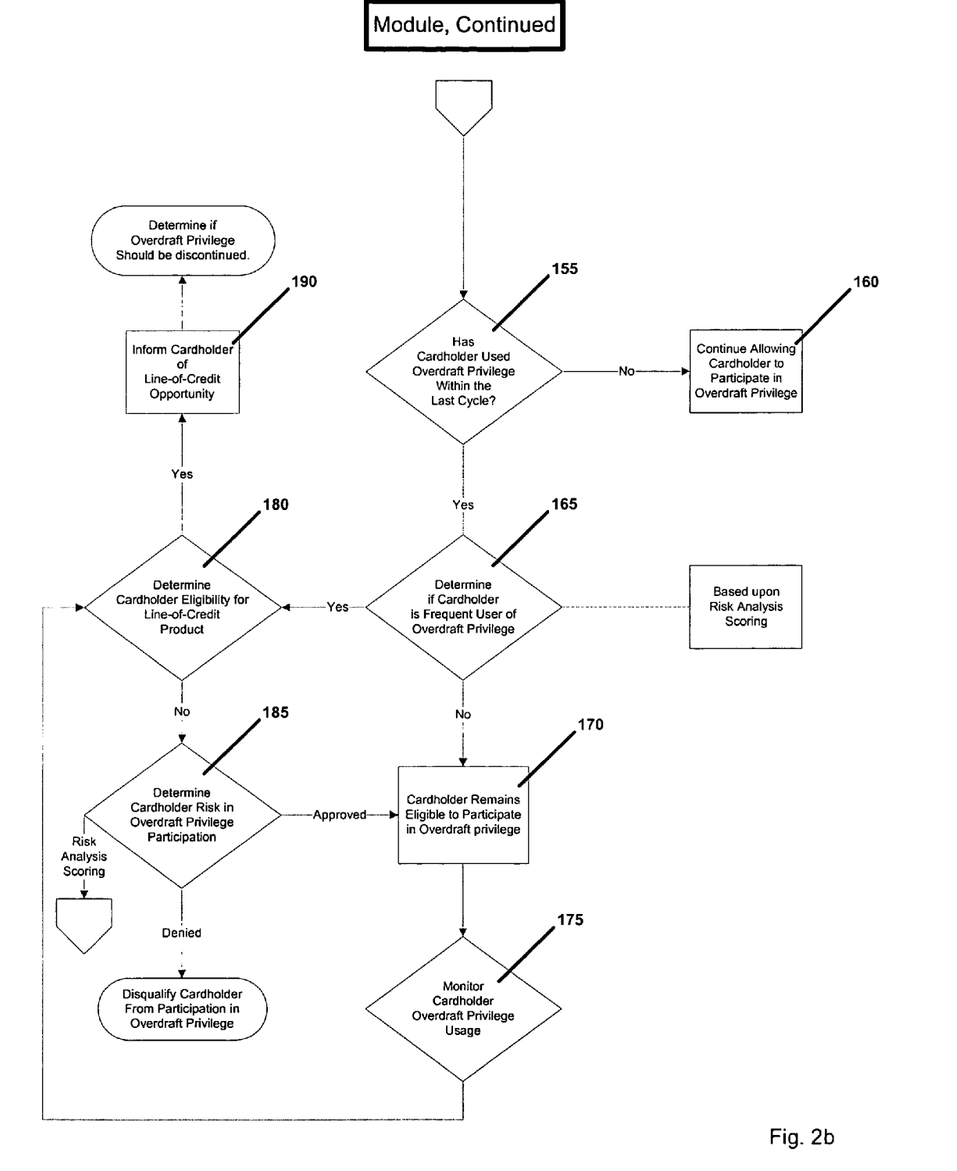

If at step 155, as shown on FIG. 2b, the system determines that the cardholder has used the overdraft privilege within the last cycle, the cardholder will be allowed to continue participating in the overdraft privilege, as set forth in step 160. However, if at step 155, the opposite determination is made, the system will utilize risk analysis scoring to determine if the cardholder is a frequent user of the overdraft privilege option, at step 165.

If the cardholder is not a frequent user of the overdraft option, at step 170, the cardholder will remain eligible to participate in overdraft privilege, and the system will continually monitor the cardholder's overdraft privilege, possibly leading to a determination regarding line-of-credit eligibility (as is discussed below).

If, at step 165, the determination is that the cardholder is eligible to receive other financial services provided by the issuing banks, the cardholder will be informed of his options, as seen in step 190, and the system will determine whether the overdraft option should be discontinued. However, if the cardholder is deemed not eligible to participate in other money management programs, he can still be approved following a determination of the risk associated with his participation in the overdraft privilege at step 185 (based on the risk analysis model).

Figure 3:
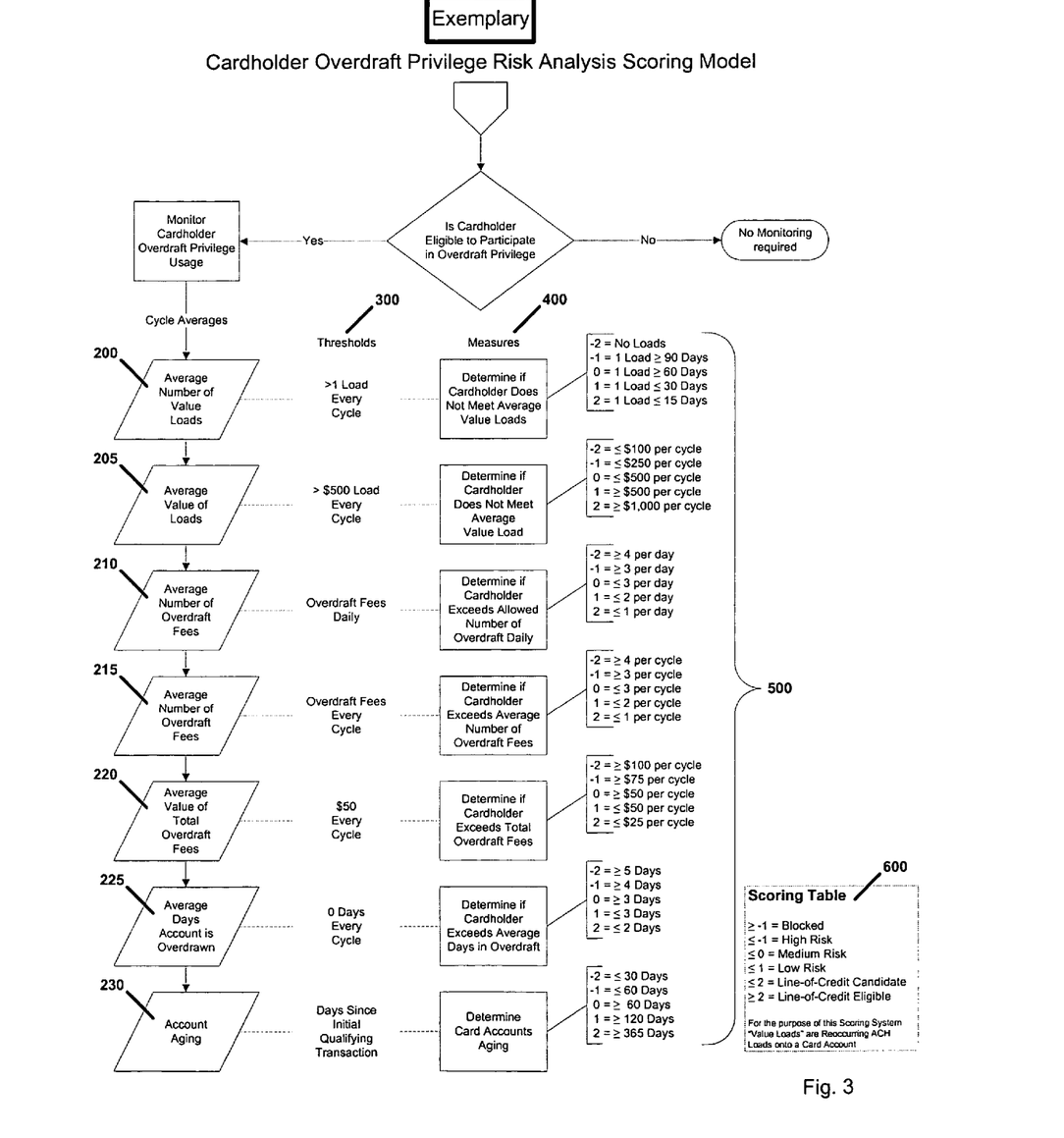
FIG. 3 is an example of an Overdraft Privilege Risk Analysis Scoring Module in accordance with the present invention.

The foregoing method is further discussed in connection with FIG. 3, where is shown an exemplary overdraft privilege risk analysis scoring model that calculates scores based on average number of value loads per step 200, average value of loads per step 205, average number of daily overdraft fees per step 210, average number of overdraft fees per cycle step 215, average value of total overdraft fees per step 220, average days account is overdrawn per step 225, and account aging per step 230. This is all done in real-time, not a traditional batch file process at the end of the business day.

Referring now to columns 300 and 400, the overdraft privilege risk analysis scoring model further determines the overdraft privilege limit by utilizing stored thresholds and customer measures. Column 500 shows a sample scoring legend for each of the thresholds 300 and measures 400. These values and quantities merely exemplify the range of optional scores a cardholder may receive throughout the overdraft privilege risk analysis scoring model. Score table 600 demonstrates the mean value of the combined average score of the measures in column 400. As would be understood by one skilled in the art, computing equipment conducts the overdraft privilege risk analysis scoring module, based on information in databases, etc., in real-time, such that no direct, human involvement is required to make overdraft privilege decisions. The computer equipment operates on a series of "weights" within the programming, as would be understood by one skilled in the art. The programming accepts "thresholds" that can be modified in order to manage the scoring in real-time.

To further exemplify the present invention, Example A shows a matrix of Customer X's loads as a participant in the present inventions' prepaid debit card with overdraft capabilities system.

In this example, Customer X is a customer of a local rent-to-own retail franchise, for example, and desires to obtain a prepaid debit card. These accounts are established via a traditional paper application or an electronic application and are maintained within a general ledger account.

Figure 4:
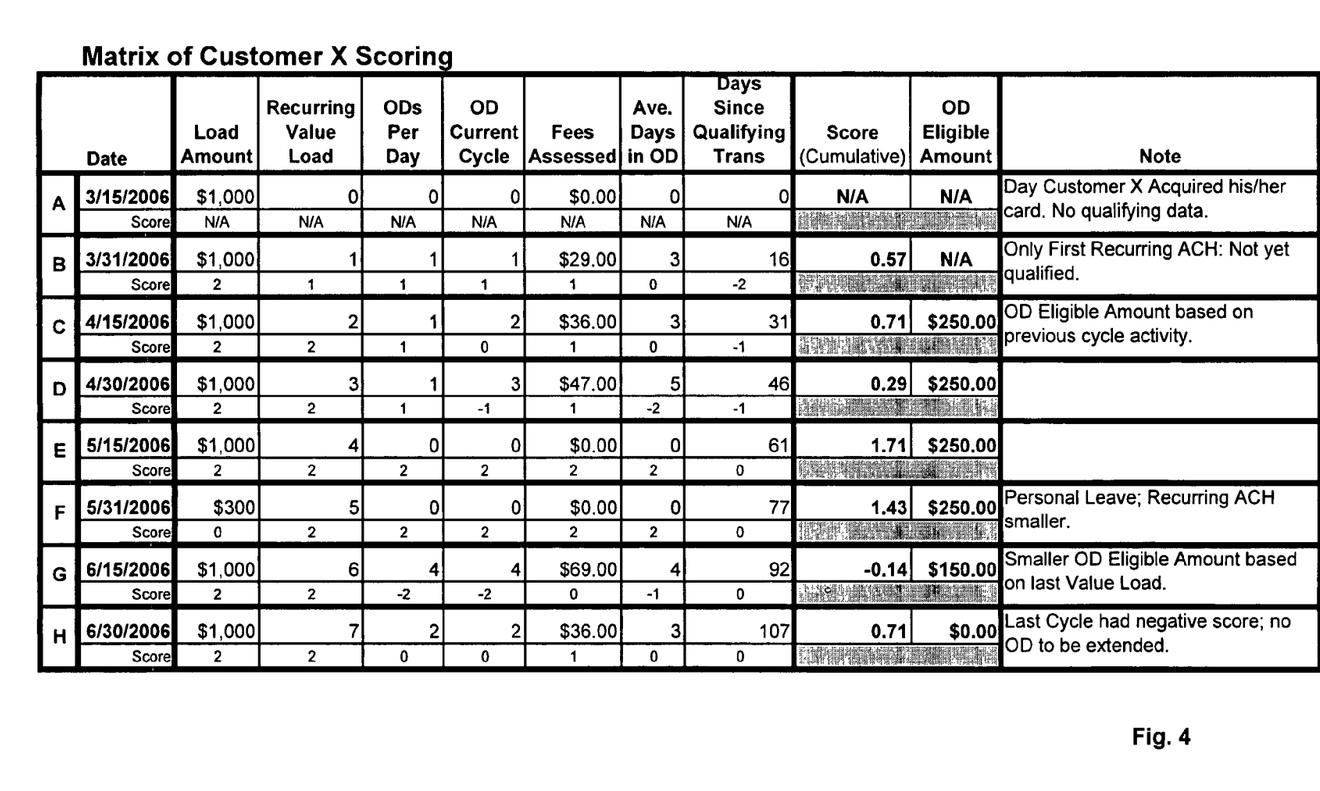
FIG. 4 is an example of the scoring spreadsheet for a particular cardholder. The scores for this sheet are derived from the scores demonstrated in FIG. 3. These scores are exemplary and the values are variable.

At phase A of FIG. 4, Customer X verifies his identification to the store clerk by providing the clerk with a driver's license, passport, Social Security Card, or other form of verifiable government issued ID. The clerk enters Customer X's personal information into a database via a web browser, or through an application program interface ("API") interface.

Customer X may choose to load additional funds onto the card at the retail location, or he may elect to load additional value onto the card via a recurring ACH deposit from his employer, a recurring benefit payment, or from Customer X's bank account.

Customer X chooses to reload funds via his payroll from his employer. Customer X earns $1,000 net twice a month and has 100% of his payroll loaded onto his prepaid card account. The first recurring ACH is received by the core processor on 3/31 of FIG. 4, at phase B and Customer X has access to all his $1,000, minus any applicable fees from the issuing bank. Note that the customer has not yet been granted a score, as he is not yet qualified to participate in overdraft privilege, according to FIG. 2a, step 105.

In this example, Customer X uses up his positive account balance prior to his next payload. Using his card to make a purchase greater then the value available on the card account caused his account to go into a negative balance, resulting in a $29.00 insufficient funds charge on his account. However, with the next electronic deposit occurring on Apr. 15, 2006 in FIG. 4, at phase C, Customer X's account is returned to a positive balance minus the insufficient funds fee. Now that two deposits have been made to Customer X's account he is eligible to participate in the overdraft privilege program, according to FIG. 2a, step 115.

Prior to the next recurring deposit on Apr. 30, 2006, Customer X overspends his account, an overdraft fee is charged to his account and he has the ability to overspend as much as $250 in this particular instance. Customer X receives a score of 0.71 based on calculated values at the time of the transaction using standard computing equipment (as an example), as illustrated in FIG. 4 for the Apr. 15, 2006, as shown again at phase C.

Customer X desires to make additional purchases, however he has not yet received another electronic payment to his account. The transaction is relatively small, only $25. The scoring module determines that the risk for the transaction is small and allows Customer X to overdraw his balance by an additional $25, minus a second overdraft fee. When an electronic deposit is made again on May 15, 2006 in FIG. 4, at phase E, the account is brought out of a negative status.

In this example, Customer X's next electronic deposit on May 31, 2006 is only $300, as shown at phase F. Within a few days Customer X overdraws his/her account once again. However, because Customer X has not had a long history of deposits of $1,000 or more, his/her allowable Overdraft Amount is reduced to 50% of his last load, or $150 during the next cycle, as shown at step 140 of FIG. 2a.

The next electronic deposit of Customer X on Jun. 15, 2006 is once again $1,000. This last deposit cycle Customer X used overdraft privilege money frequently, which impacted his score. Once Customer X's score has fallen below "0" (see phase G), overdraft privilege is denied. So when a new recurring deposit is placed on Jun. 30, 2006 the customer is deemed ineligible to receive overdraft privilege until the scoring method exceeds "0", as seen in phase H of FIG. 4.

Customer X consistently uses about $100 worth of Overdraft Privilege each week. The system flags Customer X's account as being eligible for Line-of-Credit ("LOC"), as he has had consistent deposits of $1,000 and seems to always require Overdraft Privilege at the end of his pay cycle. Customer X is contacted to ask if he would be interested in a line-of-credit attached to his card account. Line-of-credit is simply another option offered to certain cardholders who meet the criteria.

FIG. 4 is exemplary only, but shows the calculation of a cumulative average score during the cycle, and is computed in real-time, for every single transaction.

From the foregoing, those skilled in the art will recognize that the present invention overcomes the shortcomings of the prior art by enabling a prepaid debit card to have overdraft capabilities. The decision to authorize the overdraft capabilities is made in a real-time per-card, per transaction environment. The primary difference between a standard checking account and this invention is the fact that checking accounts typically do not evaluate transactions in real-time during the authorization process. Traditional bank accounts simply settle accounts at the end of the day by processing the larger transactions first then to the smallest, so customers who may have already become overdrawn can be penalized with as many overdraft fees as the bank is able to levy upon their accounts. This invention conducts the processing in real-time, evaluating every transaction do determine whether or not overdraft privilege should continue to be extended to the cardholder's individual card account. This process helps to protect the cardholder from excessive fees.

Further, the embodiments and examples set forth herein were presented in order to best explain the present invention and its practical application and to thereby enable those skilled in the art to make and use the invention. However, those skilled in the art will recognize that the foregoing description and examples have been presented for the purpose of illustration and example only. The description as set forth is not intended to be exhaustive or to limit the invention to the precise form disclosed. Many modifications and variations are possible in the light of the able teaching without departing from the spirit and scope of the following claims.

What is claimed is:

1. A computer implemented method for overdraft protection associated with a prepaid debit card to be utilized by a core processor via computing equipment, the method comprising the steps of:
    a) establishing a prepaid debit card account for a customer;
    b) receiving a request for funds through an electronic communications system from a transaction initiated by the customer;
    c) comparing the amount of the transaction to the funds available;
    d) utilizing an automated overdraft privilege risk analysis scoring module, in real-time, with no direct human interaction, to analyze the request for overdraft funds based on a series of criteria;
    e) authorizing overdraft transactions at certain amounts; and,
    f) withdrawing the overdraft privilege amount and any associated fees from the customer's account when additional funds are available in the customer's account.

2. The method according to claim 1, wherein the customer account is established via a traditional paper application or an electronic application.

3. The method according to claim 1, wherein the customer account is established within an aggregated general ledger account.

4. The method according to claim 1, wherein the customer accounts are managed by either a traditional or a non-traditional issuer.

5. The method according to claim 1, wherein the overdraft privilege module further includes the steps of:
    a) determining whether a customer participates in recurring Automated Clearing House ("ACH") activity;
    b) determining whether the customer has made more than one ACH deposit;
    c) determining whether the customer is eligible to receive the maximum amount of overdraft privilege;
    d) determining when the customer last used overdraft privilege; and
    e) determining whether to offer line-of-credit opportunity to customers.

6. The method according to claim 5, wherein the deposits correspond to a recurring ACH deposit.

7. The method according to claim 5, wherein the deposits correspond to single fund deposits by the customer at retail loading stations.

8. The method as set forth in claim 5, wherein the computing equipment utilizes real-time computed scores from the overdraft privilege risk analysis scoring module to approve the overdraft protection request.

9. The method as set forth in claim 5, wherein computing equipment utilizes computed scores from the overdraft privilege risk analysis scoring module to present a line-of-credit opportunity.

10. The method according to claim 5, wherein the overdraft privilege risk analysis scoring model calculates scores based on average number of value loads, average value of loads, average number of overdraft fees, average value of total overdraft fees, average days account is overdrawn, and account aging.

11. The method according to claim 10, wherein the overdraft privilege risk analysis scoring model determines the overdraft privilege limit by utilizing stored thresholds and customer measures.

12. The method according to claim 10, further including the step of utilizing computing equipment to automatically conduct the overdraft privilege risk analysis scoring module such that no direct, real-time human involvement is required to make overdraft privilege decisions.

13. A method for overdraft protection associated with a prepaid debit card to be utilized by a core processor, the method comprising the steps of:
    a) establishing a prepaid debit card account for a customer;
    b) managing individual customer account information that corresponds to usage of the customer account;
    c) receiving a request for funds through an electronic communication system due to a transaction initiated by the customer;
    d) utilizing a overdraft privilege risk analysis scoring module, in real-time, to analyze the request for overdraft funds based on a series of criteria;
    e) utilizing computed scores from the overdraft privilege risk analysis scoring module to approve the overdraft protection request; and
    f) withdrawing the overdraft privilege amount and any associated fees from the customer's account once additional funds are available in the customer's account.

14. The method according to claim 13, wherein the customer account is established via a traditional paper application or an electronic application.

15. The method according to claim 13, wherein the customer account is established within an aggregated general ledger account.

16. The method according to claim 13, wherein the customer accounts are managed by an agent of the issuer.

17. A computer implemented method for overdraft protection associated with a prepaid debit card to be utilized by a core processor, the method comprising the steps of:
    a) establishing a prepaid debit card account for a customer;
    b) receiving a request for funds through an electronic communications system from a transaction initiated by the customer;

c) comparing the amount of the transaction to the funds available;
d) utilizing an automated overdraft privilege risk analysis scoring module, in real time, with no direct human interaction, to analyze the request for overdraft funds based on a series of criteria, the overdraft privilege risk analysis comprising:
   i) determining whether the customer participates in recurring Automated Clearing House ("ACH") activity,
   ii) determining whether the customer has made at least one ACH deposit,
   iii) determining whether the customer is eligible to receive overdraft privilege, and
   iv) determining when the customer last used overdraft privilege;
e) authorizing overdraft transactions at certain amounts; and,
f) withdrawing the overdraft privilege amount and any associated fees from the customer's account when additional funds are available in the customer's account.

18. The method according to claim 17, wherein the step of utilizing an automated overdraft privilege risk analysis scoring module further comprises:
   v) determining whether to offer a line-of-credit opportunity to customers.

* * * * *